US009247823B2

(12) United States Patent
Van Der Jagt et al.

(10) Patent No.: US 9,247,823 B2
(45) Date of Patent: Feb. 2, 2016

(54) SEATING UNIT WITH IMPROVED STRUCTURE

(71) Applicant: FLEXSTEEL INDUSTRIES, INC., Dubuque, IA (US)

(72) Inventors: Todd R. Van Der Jagt, Dubuque, IA (US); James J. Welter, Dubuque, IA (US)

(73) Assignee: FLEXSTEEL INDUSTRIES, INC., Dubuque, IA (US)

( * ) Notice: Subject to any disclaimer, the term of this patent is extended or adjusted under 35 U.S.C. 154(b) by 8 days.

(21) Appl. No.: 14/041,579

(22) Filed: Sep. 30, 2013

(65) Prior Publication Data

US 2014/0091609 A1    Apr. 3, 2014

Related U.S. Application Data

(60) Provisional application No. 61/707,450, filed on Sep. 28, 2012, provisional application No. 61/794,340, filed on Mar. 15, 2013.

(51) Int. Cl.
| | |
|---|---|
| A47C 7/02 | (2006.01) |
| A47C 7/28 | (2006.01) |
| A47C 17/02 | (2006.01) |
| A47C 23/02 | (2006.01) |
| F16F 1/18 | (2006.01) |
| F16F 1/26 | (2006.01) |
| A47C 7/54 | (2006.01) |
| F16F 3/02 | (2006.01) |

(52) U.S. Cl.
CPC . *A47C 7/54* (2013.01); *A47C 7/024* (2013.01); *A47C 7/285* (2013.01); *A47C 17/02* (2013.01); *A47C 23/02* (2013.01); *F16F 1/187* (2013.01); *F16F 1/26* (2013.01); *F16F 3/023* (2013.01)

(58) Field of Classification Search
CPC .......... A47C 7/024; A47C 7/025; A47C 7/22; A47C 7/28; A47C 7/285; A47C 7/35; A47C 17/02; A47C 23/02; A47C 25/02; F16F 1/18; F16F 1/187; F16F 1/027; F16F 1/185; F16F 1/26; F16F 3/023
USPC .......................................................... 297/232
See application file for complete search history.

(56) References Cited

U.S. PATENT DOCUMENTS

| | | | | | |
|---|---|---|---|---|---|
| 27,037 | A | * | 2/1860 | Crane | A47C 23/02 5/242 |
| 118,782 | A | * | 9/1871 | Blakeney | A47C 7/285 267/109 |
| 133,102 | A | * | 11/1872 | Hollings | A47C 7/285 267/109 |
| 138,472 | A | * | 5/1873 | Blair | A47C 23/02 5/242 |
| 148,284 | A | * | 3/1874 | Carter | A47C 23/02 5/242 |
| 179,400 | A | * | 7/1876 | Cobb | A47C 7/285 267/109 |
| 184,533 | A | * | 11/1876 | Littlefield | A47C 23/02 267/103 |
| 282,746 | A | * | 8/1883 | Mengel | A47C 23/02 5/237 |
| 359,070 | A | * | 3/1887 | Goewey | A47C 23/007 5/255 |
| 1,167,513 | A | * | 1/1916 | Oliver | F16F 1/26 267/53 |
| 1,326,737 | A | * | 12/1919 | Johnson | A47C 7/285 267/109 |
| 1,716,518 | A | * | 6/1929 | Eggli | A47C 7/285 267/109 |

(Continued)

*Primary Examiner* — Ryan Kwiecinski
(74) *Attorney, Agent, or Firm* — Ladas & Parry LLP

(57) ABSTRACT

A seating unit includes a spring unit mounted in a frame, the spring unit having spring structures with end and middle stacked arches and interconnected to one another by tie bars, the spring unit being mounted in a frame having side rails, bottom slats, a continuous front rail, side rails, reinforcing blocks and brackets formed and arranged as a space frame.

15 Claims, 5 Drawing Sheets

(56) References Cited

U.S. PATENT DOCUMENTS

| | | | | |
|---|---|---|---|---|
| 2,115,400 A | * | 4/1938 | Schlappritzi | A47C 23/30 5/247 |
| 2,202,630 A | * | 5/1940 | Hauber | A47C 7/285 267/109 |
| 2,234,253 A | * | 3/1941 | Hopkes | A47C 7/35 267/102 |
| 2,239,057 A | * | 4/1941 | Schlappritzi | A47C 7/285 267/109 |
| 2,239,062 A | * | 4/1941 | Tallmadge | A47C 31/04 267/109 |
| 2,242,731 A | * | 5/1941 | Tallmadge | F16F 1/26 5/247 |
| 2,253,914 A | * | 8/1941 | Probst | A47C 7/285 123/65 R |
| 2,305,530 A | * | 12/1942 | Hopkes | A47C 7/35 222/248 |
| 2,365,865 A | * | 12/1944 | Copeland | A47C 23/02 267/81 |
| 2,581,483 A | * | 1/1952 | Heller | A47C 7/35 5/241 |
| 2,611,138 A | * | 9/1952 | Piliero | A47C 23/02 5/247 |
| 2,722,267 A | * | 11/1955 | Liljengren | A47C 7/285 267/112 |
| 2,788,844 A | * | 4/1957 | Crahan | A47C 7/285 267/102 |
| 2,817,390 A | * | 12/1957 | Crites | A47C 7/285 267/104 |
| 2,834,403 A | * | 5/1958 | Pitts | A47C 7/285 267/109 |
| 2,856,988 A | * | 10/1958 | Pitts | A47C 7/285 267/109 |
| 2,928,458 A | * | 3/1960 | Platt | A47C 7/285 267/105 |
| 2,935,124 A | * | 5/1960 | Platt | A47C 7/285 267/104 |
| 2,966,207 A | * | 12/1960 | Burgert | A47C 23/02 267/107 |
| 3,057,613 A | * | 10/1962 | Benjamin | A47C 7/22 267/103 |
| 3,101,487 A | * | 8/1963 | Isaacs | A47C 7/285 267/110 |
| 3,131,924 A | * | 5/1964 | Isaacs | A47C 7/285 267/107 |
| 3,156,460 A | * | 11/1964 | Santillo | A47C 7/285 267/102 |
| 3,329,466 A | * | 7/1967 | Getz | A47C 7/20 267/111 |
| 3,526,910 A | * | 9/1970 | Minoru | A47C 17/02 5/186.1 |
| 3,768,795 A | * | 10/1973 | Rathbun, Jr. | B60N 2/502 267/103 |
| 4,158,899 A | * | 6/1979 | Budimirov | A47C 7/024 267/107 |
| 4,510,635 A | * | 4/1985 | Woffendin | A47C 23/02 267/103 |
| 4,597,566 A | * | 7/1986 | Scrivner | A47C 7/025 267/102 |
| 4,657,231 A | * | 4/1987 | Surletta | A47C 7/025 267/107 |
| 4,848,843 A | * | 7/1989 | Gibbs | A47C 11/005 248/188 |
| 5,188,343 A | * | 2/1993 | Galea | A47C 7/025 267/103 |
| 5,253,851 A | * | 10/1993 | Fontana | A47C 7/22 267/102 |
| 5,346,285 A | * | 9/1994 | West, III | A47C 23/26 297/452.1 |
| 5,348,378 A | * | 9/1994 | Zhang | A47C 7/025 267/154 |
| 5,529,380 A | * | 6/1996 | Blansett | A47C 4/02 297/440.23 |
| 5,615,869 A | * | 4/1997 | Phillips | A47C 23/02 267/103 |
| 5,720,471 A | * | 2/1998 | Constantinescu | A47C 23/02 267/110 |
| 6,116,694 A | * | 9/2000 | Bullard | A47C 7/287 267/87 |
| 6,170,915 B1 | * | 1/2001 | Weisz | A47C 7/35 267/87 |
| 6,264,179 B1 | * | 7/2001 | Bullard | A47C 7/025 267/102 |
| 2004/0195743 A1 | * | 10/2004 | Pfau | A47C 7/285 267/142 |
| 2006/0267358 A1 | * | 11/2006 | Cox | A47G 29/1216 293/102 |
| 2007/0040311 A1 | * | 2/2007 | Maas | A47C 7/025 267/142 |
| 2007/0262634 A1 | * | 11/2007 | Brill | A47C 23/002 297/452.15 |
| 2009/0016807 A1 | * | 1/2009 | Koch | A47C 17/02 403/26 |
| 2012/0217777 A1 | * | 8/2012 | Solheim | A47C 17/04 297/232 |
| 2014/0091609 A1 | * | 4/2014 | Van Der Jagt | A47C 7/54 297/411.2 |
| 2014/0375103 A1 | * | 12/2014 | Lejcher | A47C 4/028 297/440.1 |

* cited by examiner

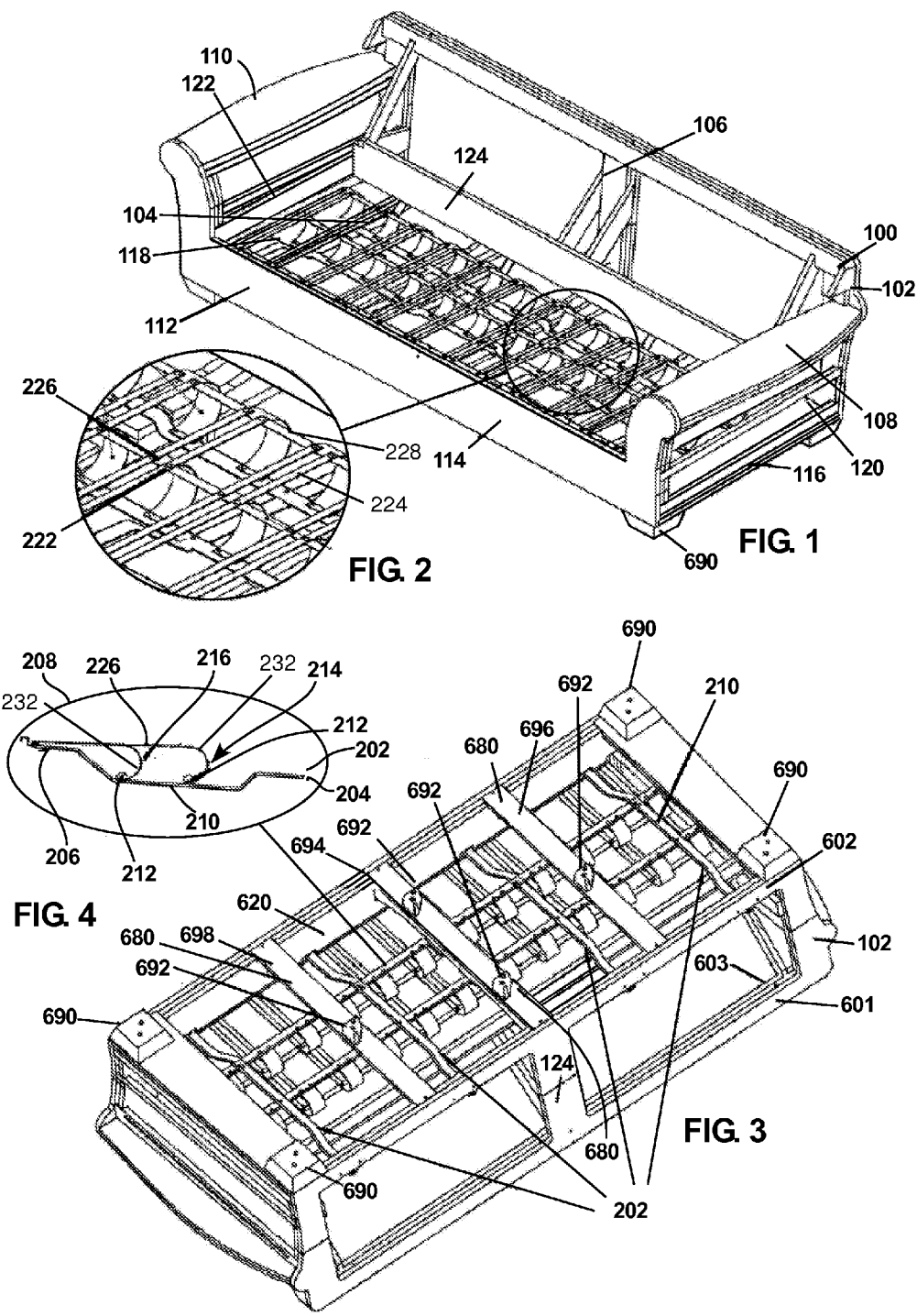

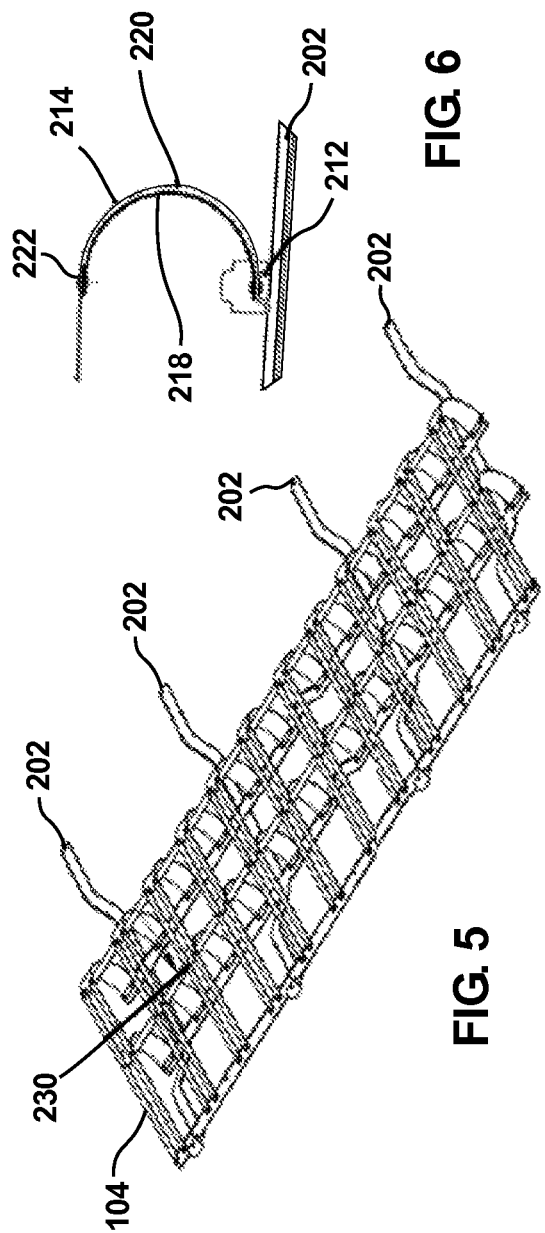

SEATING UNIT WITH IMPROVED STRUCTURE

CLAIM OF PRIORITY

This application claims priority based on Application Ser. No. 61/707,450 filed Sep. 28, 2012, and Application Ser. No. 61/794,340 filed Mar. 15, 2013, both applications having the same title and inventors as this application, said applications being incorporated herein by reference in their entirety.

FIELD OF THE INVENTION

The present invention relates to seating units with improved structure and more particularly to a frame and spring having increased strength properties with minimal increase in materials and weight.

BACKGROUND

A need exists for a new and improved seating unit, such as a sofa, loveseat, chair or the like which includes a frame adapted to support a spring unit and also receive supplemental frame components and upholstery of selected and varied configurations. Accordingly, a fabricated wooden frame with floor support, beam and brace structures receives a spring assembly having end and center support with linked leaf springs utilizing a stacked arch spring system and individual tie bars linking horizontal spring bands, the spring assembly also having improved frame mounting.

SUMMARY OF THE INVENTION

The present seating unit has a front rail assembly bonded to effectively form an equivalent to one piece construction. The front rail assembly is formed from a plurality a single pieces. The front rail assembly is formed of 3 layers of ¾" plywood. The bottom side rail is formed of 2 layers of ¾" plywood. A side rail reinforcement rail is affixed to the top of the bottom side rail. The top arm is formed of 2 layers of ¾" plywood.

Three bottom slats are arranged longitudinally (front to rear) and spaced span the width of the seating assembly. These are the center bottom slat, left bottom slat and right bottom slat. The bottom slats have bottom slat reinforcement rails to the top of the bottom slats. One each is on the left and right bottom slat. The center slat has a pair of bottom slat reinforcing rails.

Uprights 686 form part of the back assembly 106. In addition to the side uprights, a center upright is part of the back assembly 106. The back assembly top 601 and bottom 602 are particularly advantageously formed using 2 layers layer of ¾" plywood due to their complex shape, but that material is also suitable for the other structural members. Reinforcement spacer blocks and reinforcement angle braces extend from the upright to the back of the back center rail and on either side of the side uprights. The outer angle braces attach to the side and back of the back center rail.

In the prior art four perimetrical legs in each corner have been supplemented by a single center leg. Increased support for the seating assembly is provided over the prior art by having four perimetrical legs 690 with an additional four legs 692 spaced two on the center slat 694 and one each on the on the left 696 and right 698 slats.

The spring unit uses a stacked arch spring system both at the end, proximate the back, and an additional stacked arch spaced forwardly to provide a substantial increase occupant support and product longevity. This spring arch system is a combination of inner and outer arched spring and can be varied in material thickness and combination to control the overall occupant support and feel. The spring unit has individual tie bars linking horizontal spring bands which allows independent motion between units. A channel hanger bar is used to tie spring unit elements into structural unit.

There has thus been outlined, rather broadly, the more important features of the invention in order that the detailed description thereof that follows may be better understood, and in order that the present contribution of the art may be better appreciated.

Numerous aspects, features and advantages of the present invention will be readily apparent to those of ordinary skill in the art upon reading of the following detailed description of presently preferred, but nonetheless illustrative, embodiments of the present invention when taken in conjunction with the accompany drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

There has thus been outlined, rather broadly, the more important features of the invention in order that the detailed description thereof that follows may be better understood, and in order that the present contribution of the art may be better appreciated.

BRIEF DESCRIPTION OF THE DRAWINGS

The invention will be better understood and aspects other than those set forth above will become apparent when consideration is given to the following detailed description thereof. Such description makes reference to the annexed drawings wherein:

FIG. 1 is a perspective view of the seating unit with spring unit affixed in the frame, viewed from the top.

FIG. 2 is an enlargement of an area of the spring unit of FIG. 1.

FIG. 3 is a perspective view of the seating unit with spring unit affixed in the frame, viewed from the bottom.

FIG. 4 is a plan view of the spring unit.

FIG. 5 is a perspective view of the spring unit, viewed from the top.

FIG. 6 is a sectional view of the stacked arch of the spring unit.

The same reference numerals refer to the same parts throughout the various figures.

DETAILED DESCRIPTION OF THE PREFERRED EMBODIMENT

Figure 7:
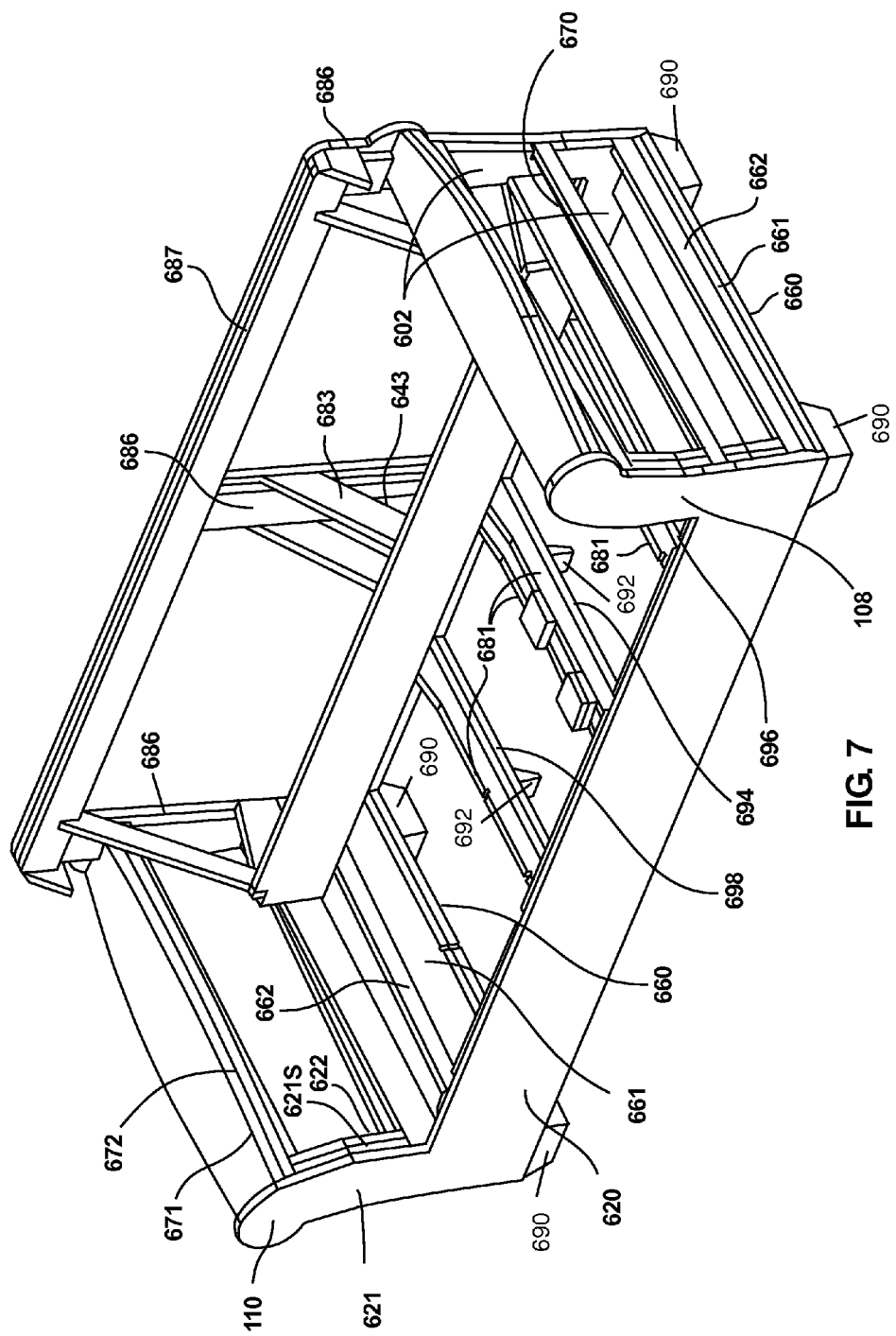
FIG. 7 is a perspective view of the frame, with the spring unit not in place, viewed from the front.
Figure 8:
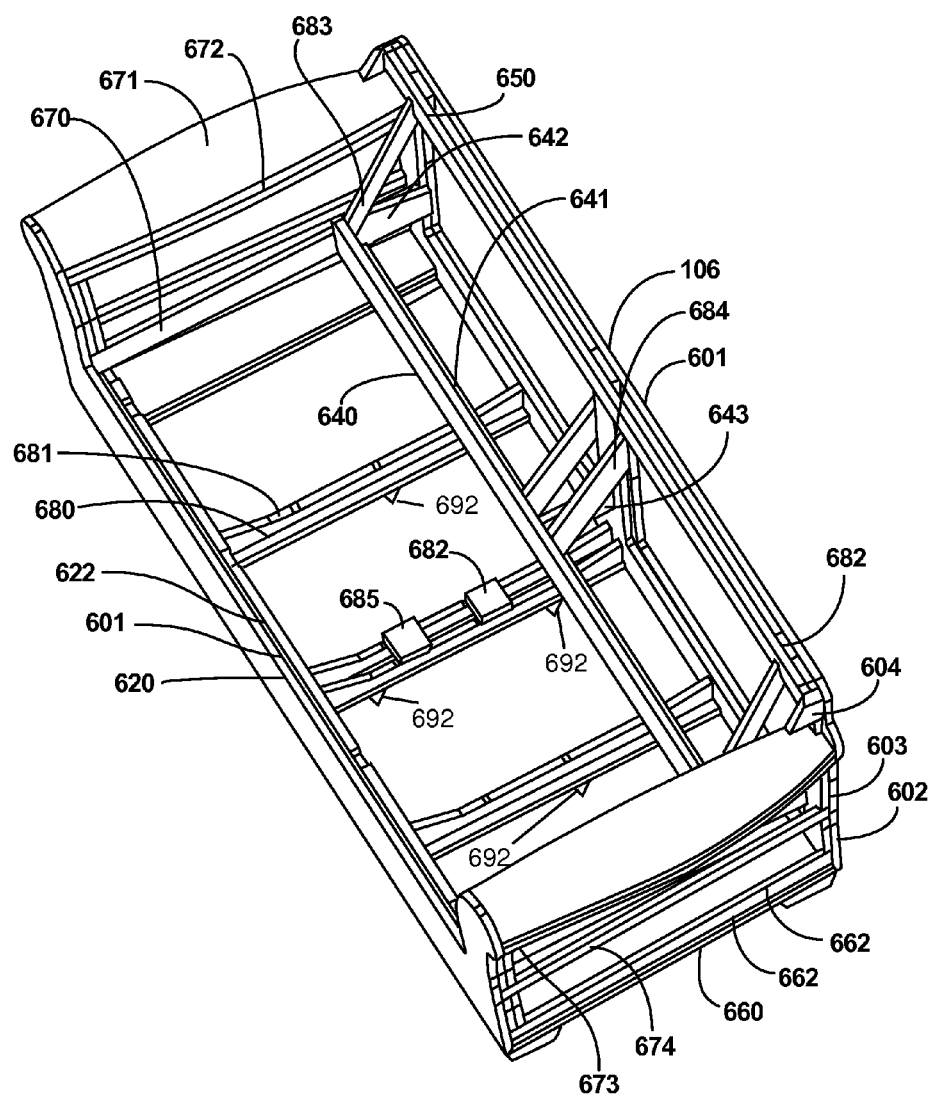
FIG. 8 is a perspective view of the frame, with the spring unit not in place, viewed from the top.

The following detailed embodiments presented herein are for illustrative purposes. That is, these detailed embodiments are intended to be exemplary of the present invention for the purposes of providing and aiding a person skilled in the pertinent art to readily understand how to make and use of the present invention. Accordingly, the detailed discussion herein of one or more embodiments is not intended, nor is to be construed, to limit the metes and bounds of the patent protection afforded the present invention, in which the scope of patent protection is intended to be defined by the claims and their equivalents thereof. Therefore, embodiments not specifically addressed herein, such as adaptations, variations, modifications, and equivalent arrangements, should be and are considered to be implicitly disclosed by the illustrative embodiments and claims described herein and therefore fall within the scope of the present invention. Further yet, the drawings are not necessarily to scale and in some instances proportions may have been exaggerated in order to more clearly depict certain features of the invention. In particular, while a sofa is shown, the frames and spring units can be shortened in width such as to provide for a love seat or a chair, or lengthened to provide more seating positions in a wider sofa.

Further, it should be understood that, although steps of various the claimed method may be shown and described as being in a sequence or temporal order, the steps of any such method are not limited to being carried out in any particular sequence or order, absent an indication otherwise. That is, the claimed method steps are to be considered to be capable of being carried out in any sequential combination or permutation order while still falling within the scope of the present invention.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in this specification do not necessarily all refer to the same embodiment. Furthermore, the particular features, structures, or characteristics may be combined in any suitable manner in one or more embodiments.

A seating unit 100 is formed of a frame 102 and spring unit 104. The frame 102 has a back assembly 106, arms 108, 110 and a seat assembly 112. Seat assembly 112 includes front rail assembly 114 side rails 116, 118, side center rails 120, 122 and back center rail assembly 124.

Spring unit 104 is composed of a plurality of hanger bars 202 with mounting ends 204, 206. Four are used on the sofa. End 206 at the front of the seating unit terminates with hanger brackets 208 for mounting to front rail assembly 114. Hanger bars 202 can be formed with a "hat" section or channel and have a middle portion 210 that supports frame irons 212 and, at a Frame Iron—Arch—connection, stacked arches 214, 216. Stacked Arch 214 is an end stacked arch, stacked arch 216 is located forwardly relative to the back and provides support in the middle of the spring unit. The construction will be described with reference to stacked arch 214, but the arches are formed in the same manner in both locations.

Stacked arch 214 is formed of inner arch 218 and outer arch 220. These are joined at the top by fasteners, such as semi-tubular oval head rivets 222 to form a unit with flat band leaf springs 224 and middle stacked arches 216 to form individual spring structures 226, each structure being interconnected to at least one other structure by transversely extending tie bars 228 to form an upper deck 230. Unlike prior art which typically, in the position of tie bars 226 had full width cross bars, the tie bars permit a greater degree of independent movement of structures.

The lower part of stacked arches 214, 216 are also secured with rivets 222 and fastened to frame irons 212 at Frame Iron—Arch—connections. When all spring structures 226 have been assembled with tie bars 228 and frame irons 212 and frame irons 212 attached (also with rivets 222) to hanger bars 202 a complete spring unit 104 is formed. The drop in hanger bars 202 from ends 204, 206 to middle portion 210 lowers deck 230 while permitting sufficiently large section members in frame 102. Frame irons 212 can be formed of a channel or "hat" section and extend substantially straight, or frame iron arches 232 may be formed to provide clearance for additional frame members.

The spring unit 104 uses a stacked arch 214, 216 spring system with a stacked arch 214 at the end, proximate the back, and an additional stacked arch 216 spaced forwardly to provide a substantial increase occupant support and product longevity. This spring arch system is a combination of inner 218 and outer 220 spring arch members and can be varied in material thickness and combination to control the overall occupant support and feel. The spring unit 104 has individual tie bars 228 linking horizontal spring bands or leaves 224 which allows independent motion between units or structures 226. Channel hanger bars 202 are used to tie spring unit 104 into the structural unit with frame 102. [Is this paragraph redundant?]

Frame 102 is composed of back assembly top, 601, back assembly bottom, 602, back assembly front, 603, wing, 604, front assembly, 620, front assembly front, 621, front assembly back, 622, back center rail, 640, floor back center rail, 641, horizontal brace center rail, 642, horizontal brace center rail center, 643, top rail, 650, bottom side rail, 660, side rail top, 661, floor side rail, 662, side center rail, 670, arm top, 671, arm bottom, 672, top slat, 673, floor top slat, 674, bottom slat, 680, bottom slat reinforcement, 681, block slat, 682, angle brace, 683, center angle brace, 684, unit support block top, 685, formed and arranged as shown in the drawings.

The seating unit 100 has a front rail assembly 114 bonded or joined to effectively serve as one piece construction. The front rail assembly 114 is formed from a plurality of pieces with the face and backs 621, 622. The front rail assembly 114 is advantageously formed of 3 layers of ¾" plywood.

The bottom side rail 660 is formed of 2 layers of ¾" plywood. Side rail reinforcement 661 is affixed to the top of the bottom side rail 661. The top arm is formed of 2 layers of ¾" plywood, 671, 672.

Three bottom slats 680 are arranged longitudinally (front to rear) and horizontally spaced to span the width of the seating assembly. These are the center bottom slat 694, left bottom slat 696 and right bottom slat 698. The bottom slats 680 have bottom slat reinforcement rails 681 to the top of the bottom slats. One each is on the left and right bottom slat. The center slat has a pair of bottom slat reinforcing rails 681.

Uprights 686 are formed as part of the back assembly 106. In addition to the side uprights, a center upright is part of the back assembly. The back assembly 106 is formed using 2 layers 601, 602 layer of ¾" plywood. Reinforcement spacer blocks 642, 643 and reinforcement angle braces 683 extend from the upright to the back of the back center rail and on either side of the side uprights. The outer angle braces attach to the side and back of the back center rail.

Figure 9:
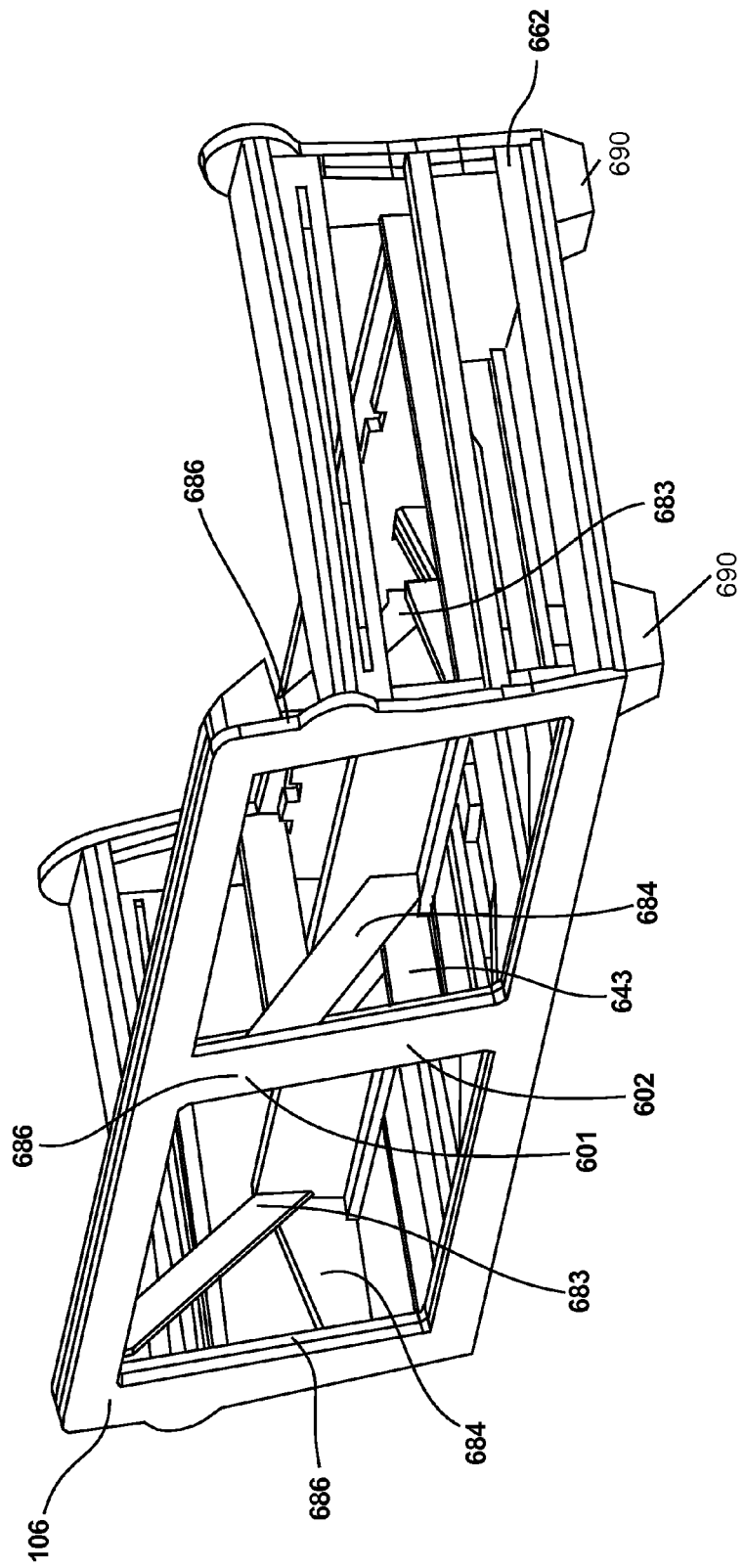
FIG. 9 is a perspective view of the frame, with the spring unit not in place, viewed from the rear.

Top rail 650, back assembly top 601, spaced apart by block slats 682 coact to provide a top portion of back assembly 106. Back assembly top 601 is spaced vertically above back assembly bottom 602 by horizontally spaced uprights 696 and block slats 682—three pairs in the case of a sofa. Back assembly front components 603 and the vertically downwardly extending portions of back assembly top 601 and vertically upwardly extending portions of back assembly bottom 602 (shown in particular in FIGS. 3 and 9) are interconnected so as to provide a structural unit. Back assembly 106 does not act, however, as a simple beam and girder, although vertically aligned, because the load parameters on a typical seating apparatus require support of loads with combined vertical and horizontal components. Back assembly 106 includes angle braces 683 and center angle brace 684 and back center rails 642, 643—three center rails in the case of a sofa—to define triangles, when viewed from the side, which impart substantial strength and rigidity without undue weight increase. Three structural triangles—in the case of a sofa—are joined horizontally at their acute apexes by back center rail 640 and floor back center rail 641 whereby a light, strong and rigid three dimensional structure is provided which resists loads having vertical, horizontal front and rear, and horizontal side to side loads, and loads having components comprising two or three of those. While examples are provided here in the case of a sofa, the seating unit 100 could also be of reduced width, such as for a chair, by retaining the side and arm assemblies but eliminating some of the units in the horizontal middle. A wider seating unit 100 could benefit by adding a middle assembly.

The structural triangles and front to rear horizontal spacing between the assembly of back center rail 640, floor center rail 641 side rail assemblies composed of side rail top, 661, side rail bottom 660, floor side rail 662 and side center rails 670, side and the vertical seat back assembly also coact with bottom slats 680, floor bottom slats 681 and front assembly members 621, 622, with a spacer 621S between members 621, 622 do define a strong, rigid, yet relatively light weight seat assembly 112. Because of the spacing of back assembly bottom 602, back center rail assembly 640, 604 and front assembly 620, 621, 622, the seat frame assembly 112 and back assembly 106 define a unitary, three dimensional space frame structure enabling support of loads having combined vertical and horizontal loads, yet also providing space to fit and locations to mount spring unit 104.

Arms 108, 110 coact with the seat assembly 112 and back assembly 106 providing a generally rectangular arm assembly, but with rails of substantial strength and interconnecting slats to provide a unitary structure in which side rail bottom 660, side rail top 661, side rail floor, 662 define the primary rail assemblies at the bottom corners (when viewed from the front) of the seating apparatus 100, with side center rail, 670, top slat, 673 and floor top slat, 674 reinforcing between the front and rear assemblies and arm top 671 and arm bottom 672 defining a top structure of the respective arms 108, 110.

Increased support for the seating assembly is provided by supplementing perimetrical four legs with an additional four legs distributed with the additional four legs spaced between on center slat and the left and right slats.

As to the manner of usage and operation of the present invention, the same should be apparent from the above description. Accordingly, no further discussion relating to the manner of usage and operation will be provided.

While a number of exemplary embodiments of the shim device, kit and method of using same have been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

In accordance with our invention, we claim:

1. A seating unit having a seat and a back, with a width, depth and height comprising:
    a frame having a back assembly, at least one arm, a plurality of bottom side rail assemblies and a seat assembly;
    said seat assembly comprises a front rail assembly, a side rail, a side center rail and a back center rail assembly being interconnected;
    mounted in said seat assembly is a spring unit formed with a plurality of hanger bars having front and rear mounting ends, said plurality of hanger bars being selected in a number depending on the width of the seating unit;
    a front of the spring unit terminates with hanger brackets for mounting to said front rail assembly;
    said plurality of hanger bars have a middle portion that supports frame irons and stacked arches, a first of said stacked arches located at said rear mounting end and a second of said stacked arches located forwardly relative to said rear mounting end so as to provide support in a middle of the spring unit;
    each of said stacked arches are formed of an inner arch and an outer arch joined at the top by fasteners, to form a unit with flat band leaf springs which form individual spring structures, each of said individual spring structures being interconnected to at least one other of said individual spring structures by transversely extending tie bars to form a deck;
    said tie bars permitting independent movement of said individual spring structures;
    each of said stacked arches have lower parts fastened to said frame irons at frame iron-arch-connections;
    each of said plurality of hanger bars descends from said front and rear mounting ends to said middle portions thereby lowering the height of said deck;
    said back assembly comprises side uprights, a center upright, and a back center rail, wherein said back center rail spans said side uprights and is mounted in crossing relation to said center upright, said back assembly further comprises reinforcement angle braces, outer angle braces, and a reinforcement spacer block mounting said side and center uprights to said back center rail, said reinforcement angle braces extending from said side uprights to the back of said back center rail and said outer angle braces attached to the side and back of said back center rail, wherein said side uprights and said center upright comprising a plurality of pieces, said plurality of pieces bonded or joined to effectively serve as one piece construction;
    said front rail assembly comprising a plurality of pieces, said plurality of pieces bonded or joined to effectively serve as one piece construction;
    said plurality of bottom side rail assemblies comprising a plurality of pieces, said plurality of pieces bonded or joined to effectively serve as one piece construction, said plurality of bottom side rail assemblies each further comprising a side rail reinforcement affixed to the top of said corresponding bottom side rail assembly;
    said frame further comprising three bottom slats aligned corresponding to said depth of said seating unit and spaced to span the width of the seating unit, said three bottom stats including a center bottom slat, a left bottom slat and a right bottom slat, said three bottom slats having bottom slat reinforcement rails mounted to the tops of said bottom slats, whereby the left and right bottom slat each have one of said bottom slat reinforcement rails and the center slat has a pair of said bottom slat reinforcement rails;

said back assembly being spaced apart from a top rail by block slats which coact to provide a top portion of said back assembly maintained vertically by horizontally spaced uprights;

each of said bottom side rail assemblies are composed of a side rail top, a side rail bottom, a floor side rail and side center rails;

said arms are formed as generally rectangular arm assemblies with arm rails and interconnecting slats providing a unitary structure;

said outer angle braces join said side uprights and said side center rails to define structural triangles whereby the connection of the bottom side rail assemblies, the front rail assembly, the arms, the back assembly, said seat assembly, and said three bottom stats define a unitary, three dimensional space frame structure enabling support of loads having combined vertical and horizontal loads, yet also providing space to fit and locations to mount said spring unit.

2. The seating unit of claim 1, wherein the seating unit is a sofa and said plurality of hanger bars comprises four hanger bars.

3. The seating unit of claim 1, further comprising said plurality of hanger bars being formed with one of a "hat" section or channel.

4. The seating unit of claim 1 further comprising said inner and outer arches are joined by semi-tubular oval head rivets.

5. The seating unit of claim 1 further comprising said frame irons being formed of one of a channel or "hat" section and one of extending substantially straight, or being formed to have frame iron arches to provide clearance for additional frame members.

6. The seating unit of claim 1 wherein the seating unit comprises a sofa, a chair, or a seating unit wider than a sofa.

7. The seating unit of claim 1 wherein said back assembly defines a space frame configured to resist vertical loads, horizontal front to rear loads, and horizontal side to side loads.

8. The seating unit of claim 1 further comprising, four perimetrical legs and an additional four legs, two of said additional four legs spaced on the center bottom slat, one of the additional four legs on the left bottom slat, and one of the additional four legs on the right bottom slat.

9. A seating unit having a seat and a back, with a width, depth and height comprising:
a frame having a back assembly, at least one arm, a plurality of bottom side rail assemblies and a seat assembly;
said seat assembly comprises a front rail assembly, a side rail, a side center rail and a back center rail assembly being interconnected;
mounted in said seat assembly is a spring unit formed with a plurality of hanger bars having front and rear mounting ends, said plurality of hanger bars being selected in a number depending on the width of the seating unit;
a front of the spring unit terminates with hanger brackets for mounting to said front rail assembly;
said plurality of hanger bars have a middle portion that supports frame irons and stacked arches, a first of said stacked arches located at said rear mounting end and a second of said stacked arches located forwardly relative to said rear mounting end so as to provide support in a middle of the spring unit;
each of said stacked arches are formed of an inner arch and an outer arch joined at the top by fasteners, to form a unit with flat band leaf springs which form individual spring structures, each of said individual spring structures being interconnected to at least one other of said individual spring structures by transversely extending tie bars to form a deck;
said tie bars permitting independent movement of said individual spring structures;
each of said stacked arches have lower parts fastened to said frame irons at frame iron-arch-connections;
each of said plurality of hanger bars descends from said front and rear mounting ends to said middle portions thereby lowering the height of said deck.

10. A seating unit having a seat and a back, with a width, depth and height comprising:
a frame having a back assembly, at least one arm, a plurality of bottom side rail assemblies and a seat assembly;
said seat assembly comprises a front rail assembly, a side rail, a side center rail and a back center rail assembly being interconnected;
a spring unit formed with a plurality of hanger bars having front and rear mounting ends, said plurality of hanger bars being selected in a number depending on the width of the seating unit;
each of said plurality of hanger bars descends from said front and rear mounting ends to middle portions thereby lowering the height of said deck;
said back assembly comprises side uprights, a center upright, and a back center rail, wherein said back center rail spans said side uprights and is mounted in crossing relation to said center upright, said back assembly further comprises reinforcement angle braces, outer angle braces, and a reinforcement spacer block mounting said side and center uprights to said back center rail, said reinforcement angle braces extending from said side uprights to the back of said back center rail and said outer angle braces attached to the side and back of said back center rail;
said front rail assembly comprising a plurality of pieces, said plurality of pieces bonded or joined to effectively serve as one piece construction;
said frame further comprises a center bottom slat, left bottom slat and right bottom slat, said center, left and right bottom slats having bottom slat reinforcement rails mounted to the tops of said bottom slats;
rectangular arm assemblies with arm rails and interconnecting slats providing a unitary structure;
said outer angle braces join said side uprights and said horizontal braces side center rails to define structural triangles whereby the connection of the bottom side rail assemblies, the front rail assembly, the arms, the back assembly, said seat assembly, and said three bottom stats define a unitary, three dimensional space frame structure enabling support of loads having combined vertical and horizontal loads, yet also providing space to fit and locations to mount said spring unit.

11. The seating unit of claim 10, wherein the seating unit is a sofa and said plurality of hanger bars comprises four hanger bars, said plurality of hanger bars are formed with one of a "hat" section or channel.

12. The seating unit of claim 10 further comprising said frame irons being formed of one of a channel or "hat" section and one of extending substantially straight, or being formed to have frame iron arches to provide clearance for additional frame members.

13. The seating unit of claim 1 wherein the seating unit comprises a sofa, a chair, or a seating unit wider than a sofa.

14. The seating unit of claim 1 wherein said back assembly defines a space frame configured to resist vertical loads, horizontal front to rear loads, and horizontal side to side loads.

15. The seating unit of claim 10 further comprising a first array of four legs and a second array of four legs spaced interior relative to first array of outer leas configured to provide increased support for the seating unit.

\* \* \* \* \*